United States Patent [19]

An et al.

[11] 4,238,692
[45] Dec. 9, 1980

[54] METHOD AND DEVICE FOR PRODUCING START PULSES IN PERIODIC MOTION PROCESS

[76] Inventors: Viktor B. An, rabochy poselok Krasnoobsk, dom 3, kv. 5; Ivan D. Bukhtiyarov, rabochy poselok Krasnoobsk, dom 3, kv. 157; Alexei S. Demin, rabochy poselok Krasnoobsk, dom 6, kv. 198; Viktor V. Kosyrev, rabochy poselok Krasnoobsk, dom 3, kv. 171, all of Novosibirskaya oblast; Valery A. Slepchuk, prospekt Dzerzhinskogo, 69, kv. 79, Novosibirsk, all of U.S.S.R.

[21] Appl. No.: 967,093

[22] Filed: Dec. 4, 1978

[30] Foreign Application Priority Data

Dec. 15, 1977 [SU] U.S.S.R. ............................. 2555284
Dec. 15, 1977 [SU] U.S.S.R. ............................. 2555286
Jan. 12, 1978 [SU] U.S.S.R. ............................. 2571117

[51] Int. Cl.³ .................... F02P 3/00; H03K 21/36; F02P 5/00
[52] U.S. Cl. ......................................... 307/106; 328/63
[58] Field of Search ................ 307/106; 123/48 E; 328/59, 63; 315/209 T

[56] References Cited

FOREIGN PATENT DOCUMENTS 2010999 10/1971 Fed. Rep. of Germany ............ 307/106

OTHER PUBLICATIONS

IBM Technical Disclosure Bulletin, "Home Pulse Selector Control Device", 1963, pp. 53–54, J. M. Cunningham.

IBM Technical Disclosure Bulletin, "Dual Channel Time Pulse Generator", 1963, pp. 51–52, V. C. Martin.

Primary Examiner—L. T. Hix
Assistant Examiner—James L. Dwyer
Attorney, Agent, or Firm—Steinberg & Raskin

[57] ABSTRACT

The production of start pulses a periodic motion process involves simultaneous generation of a basic train of pulses of a periodic motion phase, at the moment the phase is reached, and a main time interval. The duration of the main time interval is selected in dependence upon the process speed variation pattern. An initial train of pulses of the periodic motion phase, forming part of the basic pulse train, is stored during the main time interval. Upon expiration of the main time interval, an additional time interval is generated equal to at least a fraction of the pulse period of the basic pulse train, with due consideration for the parameters of physical processes influencing the periodic motion. Electric pulses are stored during the additional time interval. Then, at the moment the next phase is reached, a start pulse train is generated and the pulses of the start and initial trains are simultaneously added. As soon as the resultant sum becomes equal to a preset value, the electric pulses stored during the additional time interval are counted down to zero. A start pulse is then generated. The number of pulses in the initial train is k times greater than the number of the basic train pulses occurring during the main time interval. The value k is determined by the ratio of the number of pulses in the start pulse train to the number of pulses in the basic train.

4 Claims, 7 Drawing Figures

METHOD AND DEVICE FOR PRODUCING START PULSES IN PERIODIC MOTION PROCESS

BACKGROUND OF THE INVENTION

The present invention relates to pulse engineering, and more particularly to methods of producing start pulses in a periodic motion process and to devices for effecting same.

The invention can most advantageously be used in internal combustion engines for producing sparking or fuel injection start pulses.

At present, the growth of the automotive industry is tremendous. In this connection, more stringent requirements are imposed on the performance of internal combustion engines and on the toxicity of the exhaust gases, both characteristics being to a great extent determined by the optimality of operation of the ignition or fuel injection system.

Besides, the existing methods of producing start pulses in a periodic motion process and devices for effecting same are not accurate and flexible enough in initiating sparking or fuel injection.

Known in the art is a method of producing start pulses in the process of a periodic motion (cf. FRG Pat. No. 2,010,999; Cl. G02, p 5/08, July 4, 1974), comprising generation, at the moment a given periodic motion phase is reached, of a basic train of periodic motion phase pulses with simultaneous generation of a main time interval and storage, during the main time interval, of an initial train of periodic motion phase pulses forming part of the basic train, and generation, at the moment the next periodic motion phase is reached, of a start train of periodic motion phase pulses with simultaneous addition of the periodic motion phase pulses in the start and initial trains, with a start pulse being produced as soon as the result of the addition of the periodic motion phase pulses in the start and initial trains becomes equal to a preset value.

This prior art method, however, does not permit the duration of the main time interval to be varied with due account for the periodic motion speed variation pattern.

In addition, in the prior art method, the periodic motion speed is measured well before a start pulse is produced, whereby the dynamic error is increased.

At the moment start pulses are produced by the prior art method, there is no consideration or account taken of the parameters of physical factors (load, temperature, humidity, etc.) influencing the periodic motion.

Another disadvantage of the known method is due to the fact that because of the non-multiplicity of the periodic motion phase pulses within the duration of the main time interval, the periodic motion phase pulses in the initial train, the number of which is proportional to the average periodic motion speed, are determined with an error lying within the limits of a periodic motion phase. This, in turn, make it impossible to produce a start pulse with an accuracy better than such limits. Therefore, the error in producing start pulses in the low rpm range, when the main time interval includes a small number of periodic motion phase pulses, is substantial.

Further, when the prior art method is used for objects with a small number of specific or distinct periodic motion phases, the magnitude of the error in producing start pulses limits their use without additional improvements.

A device for producing start pulses in a periodic motion process by the prior art method is known. The device comprises a sensor of a given periodic motion phase, connected to a main time interval generator, to a counter and to a control unit, and a sensor of periodic motion phase pulses, connected to the control unit.

The prior art device does not consider or take into account those periods of the periodic motion phase pulses which are included in the main time interval. As a result, the accuracy of producing start pulses is determined by the limits of a periodic motion phase and, just as in any digital system, it cannot be better than +1 pulse, that is, +1 specific periodic motion phase. For example, if the control member is a vehicular engine flywheel having about 130 teeth, the accuracy of producing start pulses at low rpm cannot be better than $360°/130° \approx 2.8°$, although the ignition advance angle varies within 5° to 35°. Thus, in the low rpm range, the error in producing start pulses may be 50% and higher.

In addition, in the known device, the periodic motion speed, which is the number of pulses in the initial train, is determined well before the start train of periodic motion pulses which results in a substantial dynamic error, particularly under such transient conditions as rundowns or runups. In this case, in the low rpm range, for example, in vehicular engines, the rotational speed varies up to 30% and above per crankshaft revolution.

In order to attain high accuracy in producing start pulses by the prior art device, the control member has to be improved. Therewith, an additional mask with a greater number of specific periodic motion phases must be placed on the control member or the control member itself must be improved. This leads to additional expenses and low efficiency of the device.

SUMMARY OF THE INVENTION

An object of the present invention is to provide a method of producing start pulses in a periodic motion process, to provide greater accuracy in producing start pulses.

Another object of the invention is to provide a device for producing start pulses in a periodic motion process, using the foregoing method and having additional units for providing greater accuracy in producing start pulses in control members with any number of specific periodic motion phases.

These objects are attained by generating, in a method of producing start pulses in a periodic motion process, at the moment a given periodic motion phase is reached, a basic train of periodic motion phase pulses. A main time interval is simultaneously generated. An initial train of periodic motion phase pulses, forming part of the basic train, are stored during the main time interval. At the moment the next periodic motion phase is reached, a start train of periodic motion phase pulses is generated. The periodic motion phase pulses in the start and initial trains, are simultaneously added. A start pulse is generated as soon as the resultant sum of the periodic motion phase pulses in the start and initial trains becomes equal to a preset value. In accordance with the invention, the duration of the generated main time interval is selected in dependence upon the periodic motion process variation pattern. Upon expiration of the main time interval, an additional time interval is generated. The additional time interval is equal to at least a fraction of the period of the periodic motion phase pulses in the basic train, with due consideration for the parameters of physical processes influencing the periodic motion. Electric pulses are simultaneously stored during the additional time interval. As soon as the resultant sum of the periodic motion phase pulses in the start and initial trains becomes equal to a preset value, the electric pulses stored during the additional time interval are counted down to zero. A start pulse is then generated. The number of periodic motion phase pulses in the initial train is k times greater than that of the periodic motion phase pulses in the basic train, occurring during the main time interval. The value k is determined by the ratio of the number of periodic motion phase pulses in the start train to the number of periodic motion phase pulses in the basic train.

Preferably, the counting of the electric pulses stored during the additional time interval should be n times slower than their storage, where the value n is determined by the ratio of the number of periodic motion phase pulses in the start train to that of the periodic motion phase pulses in the basic train, as well as by the parameters of the physical processes influencing the periodic motion.

The objects of the invention are also attained by a device for producing start pulses in a periodic motion process, comprising a sensor of a given periodic motion phase. A main time interval generator, a counter and a sensor are associated with the sensor of a given periodic motion phase. A sensor of periodic motion phase pulses is coupled to the control unit. In accordance with the invention, the device also comprises a series arrangement including an additional time interval generator connected to the main time interval generator, the sensor of periodic motion phase pulses and the control unit. An electric pulse storage and counting unit is connected to the sensor of a given periodic motion phase and the counter.

Preferably, the device for producing start pulses in a periodic motion process comprises a multiplier unit inserted between the counter and the control unit and connected the additional time interval generator and to the sensor of a given periodic motion phase.

The present invention enables taking into account fractions of the periodic motion phase pulse periods, which substantially improves the accuracy of producing start pulses.

In addition, the invention permits speed measurement immediately prior to producing a start train. The invention also permits correction of the speed, depending on other physical factors and processes such as, for example, the dynamics of the control member under transient conditions, load, temperature and so on, which enables the dynamic error to be minimized and the start pulses to be more flexibly controlled depending on other parameters.

Another advantage offered by the present invention is that, due to its ability to measure pulse period fractions, it can be used in control members with a small number of specific periodic motion phases. This extends the range of its application without improving the control member itself.

BRIEF DESCRIPTION OF THE DRAWINGS

Other objects and advantages of the present invention will become more apparent from the following detailed description of a specific embodiment thereof, taken in conjunction with the accompanying drawings, wherein.

DESCRIPTION OF PREFERRED EMBODIMENTS

Figure 1:
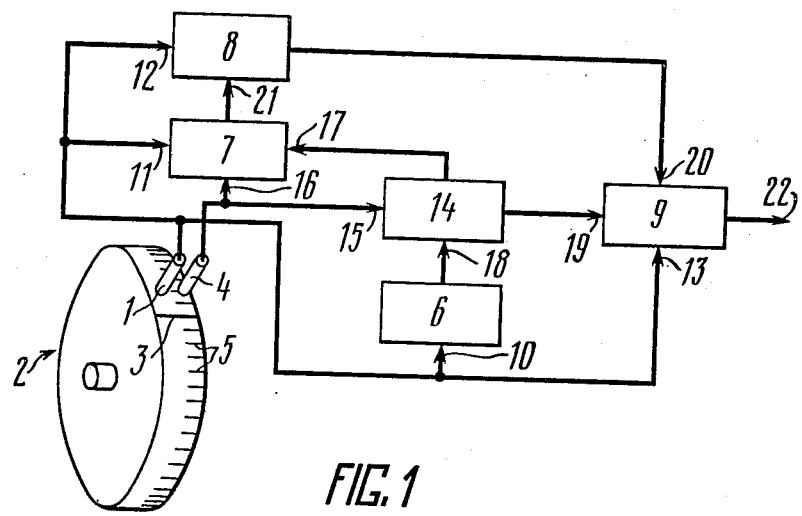
FIG. 1 is a block diagram of an embodiment of the device of the invention for producing start pulses in a periodic motion process.

The proposed method of producing start pulses in a periodic motion process consists of simultaneous generation of a basic train of periodic motion phase pulses, at the moment a given phase of the periodic motion is reached, and a main time interval. The duration of the main time interval is selected in dependence upon the periodic motion speed variation pattern. During the main time interval, an initial train of periodic motion phase pulses, forming part of the basic train are stored. An additional time interval, equal to at least a fraction of the period of the periodic motion phase pulses in the basic train, with due consideration for the parameters of physical processes influencing the periodic motion is generated at the moment of expiration of the main time interval. Electric pulses are stored during the additional time interval. A start train of periodic motion phase pulses is generated at the moment the next periodic motion phase is reached. As soon as the resultant sum of the pulses becomes equal to a preset value, the electric pulses stored during the additional time interval are counted down to zero. A start pulse is then produced. The number of periodic motion phase pulses in the initial train is k times greater than the number of pulses in the basic train, occurring during the main time interval. The value k is determined by the ratio of the number of periodic motion phase pulses in the start train to that of the periodic motion phase pulses in the basic train.

In addition, the counting of the electric pulses stored during the additional time interval is n times slower than their storage, the value n being determined by the ratio of the number of periodic motion phase pulses in the start train to that of periodic motion phase pulses in the basic train, as well as by the parameters of the physical processes influencing the periodic motion.

The method of the invention produces start pulses in internal combustion engines, for example, in the ignition system to initiate sparking, or in the fuel system to initiate fuel injection, or in variable-rpm centrifuges used for photographic lighting.

The device of the invention for producing start pulses in a periodic motion process may be used in the ignition system of an internal combustion engine to produce sparking start pulses.

The device of the invention comprises a sensor 1 (FIG. 1) of a given periodic motion phase, mounted in direct proximity with a flywheel 2 of an internal combustion engine (not shown) in the Figs. and sensing a mark 3 of a given periodic motion phase. A sensor 4 of periodic motion phase pulses is mounted in direct proximity with the flywheel 2 and senses marks 5 of periodic motion phase pulses. Associated with the sensor 1 are a main time interval generator 6, a control unit 7, a counter 8 and an electric pulse storage and counting unit 9. The counter 8 and electric pulse storage and counting unit 9 are interconnected through their inputs 10, 11, 12 and 13. An additional time interval generator 14 and the control unit 7 have their inputs 15 and 16 connected to the sensor 4. The control unit 7 has an input 17 coupled to the output of the generator 14. The generator 14 has an input 18 connected to the output of the generator 6. The storage and counting unit 9 has inputs 19 and 20 which are connected to the outputs of the generator 14 and the counter 8, respectively. The input 21 of the counter 8 is coupled to the output of the control unit 7. The unit 9 has an output 22 which serves as the output of the device.

Figure 2:
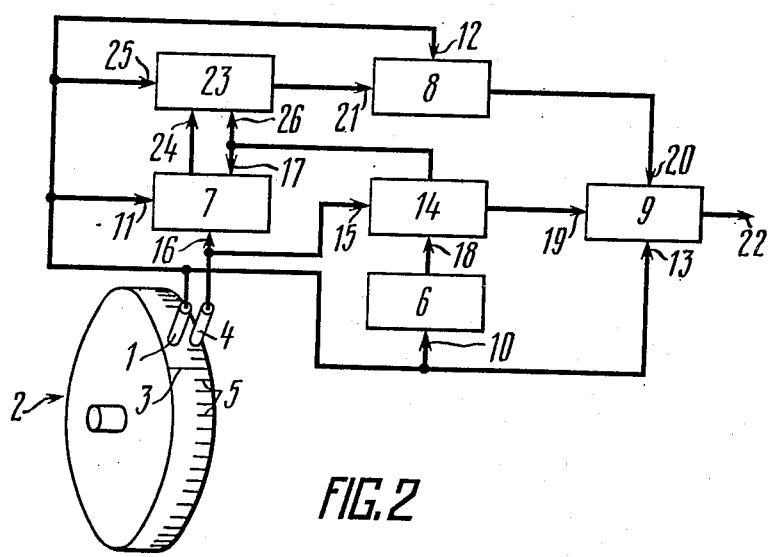
FIG. 2 is a block diagram of an embodiment of the device of the invention for producing start pulses with a multiplier unit.

The device for producing start pulses in a periodic motion process, in the case where the number of periodic motion phase pulses in the basic train is n times less than the number of periodic motion phase pulses in the initial train, comprises a multiplier unit 23 (FIG. 2). As shown in FIG. 2, the multiplier unit 23 is interposed between the control unit 7 and the counter 8 and has an input 24 connected to the output of the control unit 7 and an output connected to the input 21 of the counter 8. Inputs 25 and 26 are connected to the outputs of the sensor 1 of a given periodic motion phase and the additional time interval generator 14, respectively,.

Figure 3:
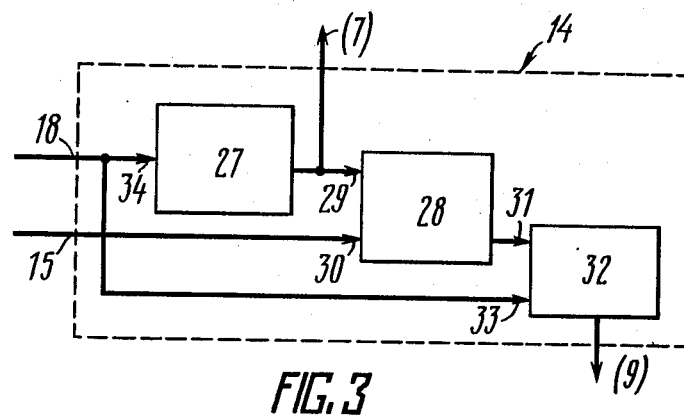
FIG. 3 is a block diagram embodiment of the additional time interval generator of the invention.

The additional time interval generator 14 comprises a NOT gate 27 (FIG. 3). An input 29 of an OR gate 28 is conneted to the output of the NOT gate 27.

The other input 30 of the OR gate 28 is the input 15 (FIGS. 1 and 2) of the generator 14. An input 31 of a flip-flop 32 is connected to the output of the OR gate 28 (FIG. 3). The other input 33 of the flip-flop 32 and an input 34 of the NOT gate 27 are the input 18 (FIGS. 1 and 2) of the generator 14.

Figure 4:
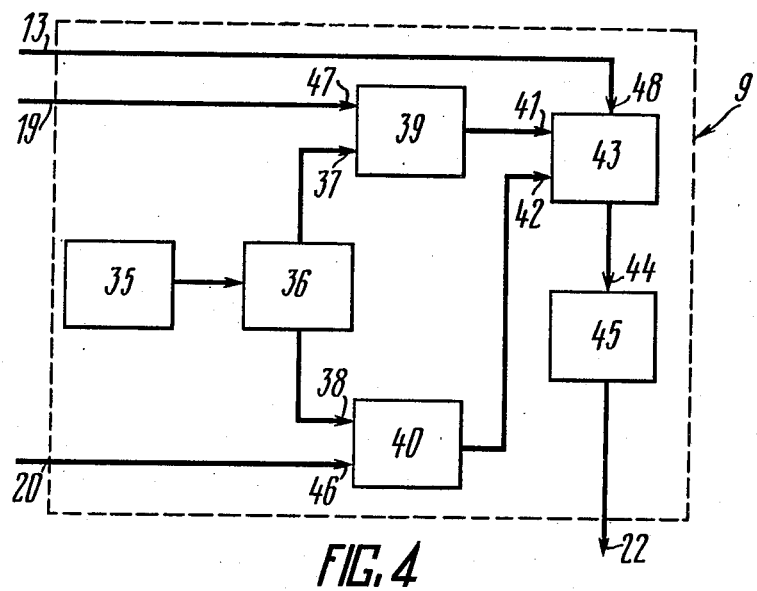
FIG. 4 is a block diagram of an embodiment of the electric pulse storage and cooling unit of the invention.

The electric pulse storage and counting unit 9 comprises a pulse generator 35 (FIG. 4). A frequency divider 36 is connected to the output of the pulse generator 35.

Coupled to the outputs of the frequency divider 36 are inputs 37 and 38 of AND gates 39 and 40, respectively. The outputs of the AND gates 39 and 40 are the respective inputs 41 and 42 of a bidirectional counter 43. Connected to the output of the counter 43 is an input 44 of a decoder 45. Inputs 46, 47 and 48 of the AND gate 40, the AND gate 39 and the counter 43, respectively, are the inputs 20, 19 and 13, respectively (FIGS. 1 and 2), of the unit 9.

Figure 5:
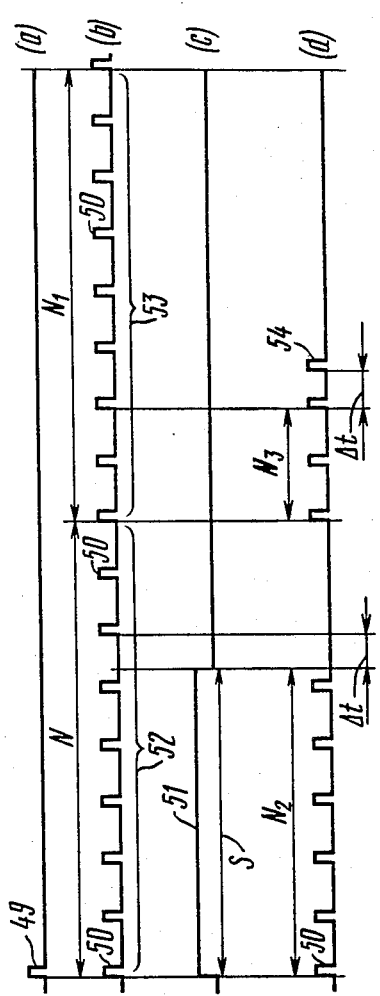
FIGS. 5a, b, c, d represents time diagrams of operation of the device of FIG. 1 of the invention.

The device for producing start pulses in a periodic motion process in the case where n=1, n being the ratio of the number of periodic motion phase pulses in the basic train to the number of periodic motion phase pulses in the start train, operates as follows:

The sensor 1 (FIG. 1) of a given periodic motion phase and the sensor 4 of periodic motion phase pulses, which are conventional induction transducers, produce periodic motion phase pulses 49 and 50, respectively (FIGS. 5a and 5b), of the same amplitude and duration. Hereinafter, the word "pulse" is used for brevity instead of "periodic motion phase pulse". The frequency of the pulses 49 and 50 is proportional to the rotational speed of the flywheel 2 (FIG. 1).

Pulses 49 (FIG. 5a) from the output of the sensor 1 (FIG. 1) are applied during each period of rotation of the flywheel 2 to the input 10 of the main time interval generator 6, the input 11 of the control unit 7, the input 12 of the counter 8 and the input 13 of the storage and counting unit 9. Pulses 50 (FIG. 5b) from the output of the sensor 4 (FIG. 1) are applied to the input 16 of the control unit 7 and the input 15 of the additional time interval generator 14. At the moment a given periodic motion phase is reached, corresponding to the mark 3 passing the sensor 1, that is, at the moment of appearance of the pulse 49 (FIG. 5a), the main time interval generator 6 is triggered to produce a pulse 51 (FIG. 5c). The pulse 51 is of the main time interval S and is applied to the input 18 (FIG. 1) of the generator 14.

Upon the application of control pulses 49 and 50 (FIGS. 5a and 5b) to the inputs 11 and 16 (FIG. 1) of the control unit 7, at the moment a given periodic motion phase is reached, said control unit generates a basic train 52 (FIG. 5b) of N pulses 50 and a start train 53 of $N_1$ pulses 50. Each train 52 and 53 contains an equal number $N=N_1$ of pulses 50. The generator 14 (FIG. 1) enables the input 17 of the control unit 7 to pass pulses 50 (FIG. 5b) of the basic train 52 to the input 21 (FIG. 1) of the counter 8 only during the interval S (FIG. 5c) of the pulse 51. In this case, the input 21 (FIG. 1) of the counter 8 receives $N_2$ pulses 50 (FIG. 5d) of the train 52. $N_2$ is also the number of pulses in the initial train. Thereafter, an additional time interval $\Delta t$ (FIG. 5d) is produced at the output of the generator 14 and applied to the input 19 of the unit 9. The time interval $\Delta t$ is equal to a fraction or the whole of a period from the end of the time interval S (FIG. 5c) of the pulse 51 to the beginning of the nearest pulse 50 (FIG. 5b). In the unit 9, electric pulses are stored during the time interval $\Delta t$ (FIG. 5a) at a particular frequency.

As soon as the start train 53 (FIG. 5b) reaches the input 21 of the counter 8, $N_3$ pulses 50 (FIG. 5d) of the start train 53 start arriving. Thus, the pulses 50 (FIG. 5d) from the basic train 52 (FIG. 5b) and the pulses from the start train 53 are added in the counter 8. As soon as the resultant sum content of the counter 8 (FIG. 1) becomes equal to a present value, the input 21 of said counter receives a certain number of pulses 50 (FIG. 5d) of the start train 53 (FIG. 5b), and said counter produces a control signal to the input 20 (FIG. 1) of the unit 9 in the mode of counting the electric pulses stored during the time interval $\Delta t$ (FIG. 5d). At the moment the counting process is completed, that is, at zero, a start pulse 54 is produced.

Figure 6:
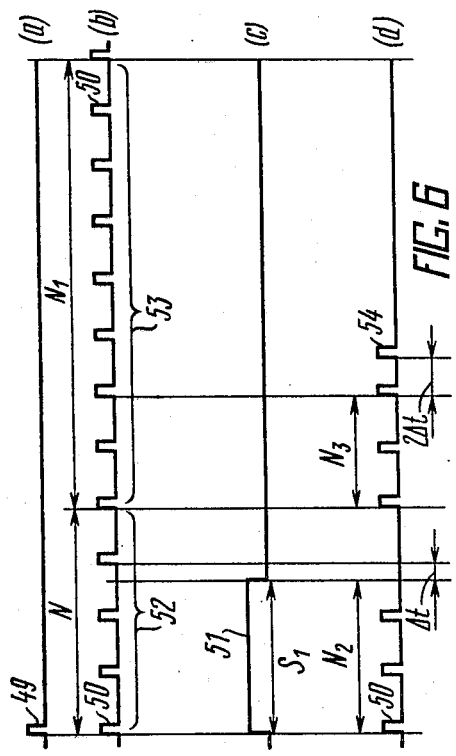
FIGS. 6a, b, c, d represents time diagrams of operation of the device of FIG. 2 of the invention in cases where n=2.

In the case where the number of pulses 50 of the basic train 52 is n times less than the number of pulses 50 of the start train 53, the device for producing start pulses in a periodic motion process operates as follows:

The inputs 25, 24 and 26 (FIG. 2) of the multiplier unit 23 receive control pulses 49 (FIG. 6a) from the sensor 1 of a given periodic motion phase, the control unit 7 and the additional time interval generator 14, respectively, as shown in FIG. 2.

In the case where n=2 the device operates similarly to the case where n=1 with the exception that a main time interval $S_1=S/2$ (FIG. 6c) is generated by the main time interval generator 6 (FIG. 2). During the time interval $S_1=S/2$ (FIG. 6c), the multiplier 23 multiplies the number $N_2$ (FIG. 6d) of pulses 50 by two, whereas in the unit 9 (FIG. 2) the counting of the pulses accumulated during the interval $\Delta t$ (FIG. 6d) is twice as slow as their storage, and a pulse 54 (FIG. 6d) is produced at the end of that interval.

Up to n=N₁ (FIGS. 5 and 6), the device operates in a similar manner.

Figure 7:
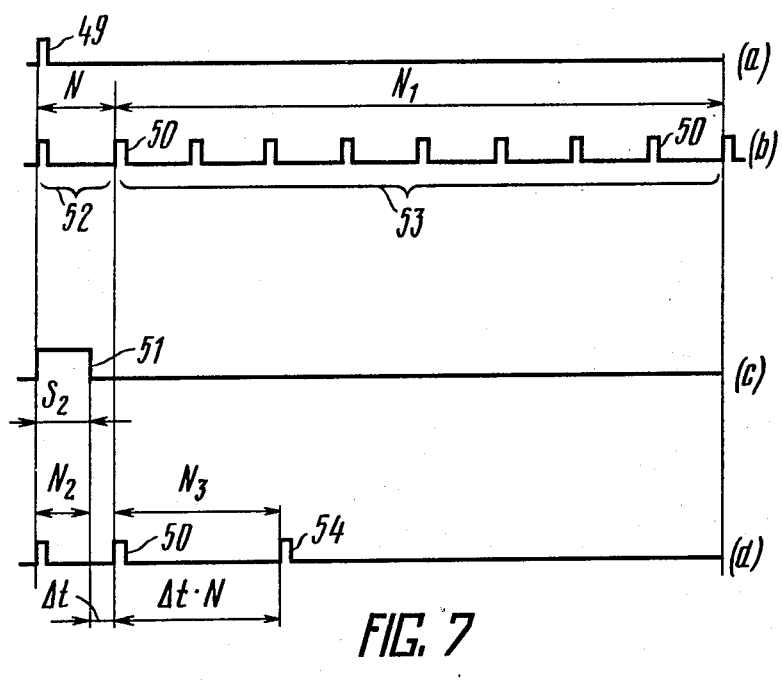
FIGS. 7a, b, c, d are time diagrams illustrating the operation of the device of FIG. 2 of the invention in cases where n equals the number of periodic motion phase pulses in the basic train of periodic motion phase pulses.

Finally, in the case where n=N₁ (FIG. 7a), that is, where the basic train 52 contains a single pulse 50, the generator 6 generates a time interval $S_2=S/N_1$ (FIG. 7c). During the time interval $S_2$, the multiplier 23 multiplies the number $N_2$ (FIG. 7c) by $N_1$ (FIG. 7b), and in the unit 9 (FIG. 2) the counting of the pulses stored during the time interval $\Delta t$ (FIG. 6d) is $N_1$ times slower than the storage. As soon as the counting is completed, a start pulse 54 (FIG. 7d) is produced.

The additional time interval generator 14 (FIGS. 1 and 2) operates as follows:

As soon as the leading edge of a pulse 51 (FIGS. 5c, 6c and 7c) is applied via the NOT gate 27 (FIG. 3) and the OR gate 28 to the input 31 of the flip-flop 32, said flip-flop is reset. The arrival of the trailing edge of the pulse 51 (FIGS. 5c, 6c and 7c) produced by the generator 6 (FIGS. 1 and 2) at the input 33 of the flip-flop 32 (FIG. 34) changes the state of said flip-flop. The arrival of the first pulse 50 (FIG. 7b) resets the flip-flop 32 (FIG. 3).

Thus, the flip-flop 32 produces a pulse equal in duration to the interval $\Delta t$ (FIGS. 5d, 6d and 7d) from the end of the pulse 51 (FIGS. 5c, 6c and 7c) to the beginning of the next pulse 50 (FIGS. 5b, 6b and 7b).

The pulse storage and counting unit 9 (FIGS. 1 and 2) operates as follows:

A pulse 49 (FIG. 5a, 6a and 7a) from the sensor 1 (FIGS. 1 and 2) applied to the input 48 (FIG. 4) of the bidirectional counter 43 resets said counter. As soon as a pulse 51 (FIGS. 5c, 6c and 7c) arrives at the input 47 (FIG. 4) of the AND gate 39, the pulses from the pulse generator 35 pass, via the frequency divider 36 and the AND gate 39 to the input 41 of the bidirectional counter 43 for addition.

As soon as the contents of the counter 8 (FIGS. 1 and 2) become equal to a preset value, said counter enables the input 20 of the pulse storage and counting unit 9 (FIGS. 1, 2 and 4) to pass pulses of the generator 35 (FIG. 4) via the frequency divider 36 and the AND gate 40 to the input 42 of the bidirectional counter 43 for subtraction. When the contents of the bidirectional counter 43 become equal to zero, as defined by the decoder 45, a start pulse 54 (FIG. 5d, 6d and 7d) is produced.

The present invention has economic advantages, since the accurate generation of start pulses with respect to speed and the control of the moment at which a start pulse is produced, with due consideration for other physical processes and factors, permits substantial improvement, for example, in internal combustion engines, of the engine dynamics, minimizing the fuel consumption and toxicity of the exhaust gases.

In addition, the present invention can be used in practically all applications involving cyclic action with moving components featuring a small number of specific phases.

The method of the invention for producing start pulses in a periodic motion process thus comprises the steps of generating a basic train of periodic motion phase pulses at the moment a given periodic motion phase is reached in the periodic motion process, generating a main time interval simultaneously with the basic train of periodic motion phase pulses, storing, during the main time interval and simultaneously with the generating of the main time interval, an initial train of periodic motion phase pulses forming part of the periodic motion phase pulses in the basic train of periodic motion phase pulses, generating an additional time interval equal to at least a fraction of the period of the periodic motion phase pulses of the basic train, with due consideration of the parameters of physical processes influencing the periodic motion, the generating of the additional time interval commencing upon the expiration of the main time interval, storing electric pulses during the additional time interval and simultaneously with the generating of the additional time interval, generating a start train of periodic motion pulses at the moment the next periodic motion phase is reached, the periodic motion phase pulses of the basic train occurring during the main time interval in a number which is k times less than the number of the periodic motion phase pulses of the initial train, wherein k is a value determined by the ratio of the number of the periodic motion phase pulses in the start train to the number of the periodic motion phase pulses in the basic train, adding the periodic motion phase pulses of the start train and of the initial train simultaneously with the generating of the start train of periodic motion phase pulses, and counting down to zero the electric pulses stored during the additional time interval as soon as the resultant sum of the periodic motion phase pulses of the start and initial trains equals a preset value.

In the method of the invention, the counting down of the electric pulses is n times slower than the storing of the electric pulses, wherein n is a value determined by the ratio of the number of the periodic motion phase pulses in the start train to the number of the periodic motion phase pulses in the basic train and by the parameters of physical processes influencing the periodic motion.

The device of the invention for producing start pulses in a periodic motion process thus comprises a phase sensor for sensing a given periodic motion phase. The phase sensor has an output. A control unit has a first input electrically connected to the output of the phase sensor, a second input, a third input, and an output. A counter has a first input electrically connected to the output of the phase sensor, a second input electrically connected to the output of the control unit, and an output. A main time interval generator has an input electrically connected to the output of the phase sensor, and an output. An electric pulse storage and counting unit has a first input electrically connected to the output of the counter, a second input electrically connected to the output of the phase sensor, a third input, and an output at which start pulses are provided. A pulse sensor senses periodic motion phase pulses. The pulse sensor has an output electrically connected to the second input of the control unit. An additional time interval generator has a first input electrically connected to the output of the main time interval generator, a second input electrically connected to the output of the pulse sensor, a first output electrically connected to the third input of the control unit and a second output electrically connected to the third input of the electric pulse storage and counting unit.

A multiplier unit may be interposed between the control unit and the counter. The multiplier unit has a first input electrically connected to the output of the control unit, a second input electrically connected to the output of the phase sensor, a third input electrically connected to the first output of the additional time interval generator, and an output electrically connected to the second input of the counter.

What is claimed is:

1. A method of producing start pulses in a periodic motion process, said method comprising the steps of
generating a basic train of periodic motion phase pulses at the moment a given periodic motion phase is reached in the periodic motion process;
generating a main time interval simultaneously with said basic train of periodic motion phase pulses;
storing, during the main time interval and simultaneously with the generating of said main time interval, an initial train of periodic motion phase pulses forming part of said periodic motion phase pulses in said basic train of periodic motion phase pulses;
generating an additional time interval equal to at least a fraction of the period of said periodic motion phase pulses of said basic train, with due consideration of the parameters of physical processes influencing said periodic motion, the generating of the additional time interval commencing upon the expiration of said main time interval;
storing electric pulses during said additional time interval and simultaneously with the generating of said additional time interval;
generating a start train of periodic motion pulses at the moment the next periodic motion phase is reached, said periodic motion phase pulses of said basic train occurring during said main time interval in a number which is k times less than the number of said periodic motion phase pulses of said initial train, wherein k is a value determined by the ratio of the number of said periodic motion phase pulses in said start train to the number of said periodic motion phase pulses in said basic train;
adding said periodic motion phase pulses of said start train and of said initial train simultaneously with the generating of said start train of periodic motion phase pulses; and
counting down to zero said electric pulses stored during said additional time interval as soon as the resultant sum of said periodic motion phase pulses of said start and initial trains equals a preset value.

2. A method as claimed in claim 1, wherein the counting down of said electric pulses is n times slower than the storing of said electric pulses, wherein n is a value determined by the ratio of the number of said periodic motion phase pulses in said start train to the number of said periodic motion phase pulses in said basic train and by the parameters of physical processes influencing the periodic motion.

3. A device for producing start pulses in a periodic motion process, said device comprising
a phase sensor for sensing a given periodic motion phase, said phase sensor having an output;
a control unit having a first input electrically connected to the output of said phase sensor, a second input, a third input, and an output;
a counter having a first input electrically connected to the output of said phase sensor, a second input electrically connected to the output of said control unit, and an output;
a main time interval generator having an input electrically connected to the output of said phase sensor, and an output;
an electric pulse storage and counting unit having a first input electrically connected to the output of said counter, a second input electrically connected to the output of said phase sensor, a third input, and an output at which start pulses are provided;
a pulse sensor for sensing periodic motion phase pulses, said pulse sensor having an output electrically connected to the second input of said control unit; and
an additional time interval generator having a first input electrically connected to the output of said main time interval generator, a second input electrically connected to the output of said pulse sensor, a first output electrically connected to the third input of said control unit and a second output electrically connected to the third input of said electric pulse storage and counting unit.

4. A device for producing start pulses in a periodic motion process as claimed in claim 3, further comprising a multiplier unit interposed between said control unit and said counter, said multiplier unit having a first input electrically connected to the output of said control unit, a second input electrically connected to the output of said phase sensor, a third input electrically connected to the first output of said additional time interval generator, and an output electrically connected to the second input of said counter.

* * * * *